United States Patent [19]

Ishikura et al.

[11] Patent Number: 4,468,493
[45] Date of Patent: Aug. 28, 1984

[54] HIGH SOLID COATING COMPOSITION CONTAINING NOVEL MICROPARTICLES OF CROSSLINKED COPOLYMER CONTAINING AMPHOIONIC GROUPS

[75] Inventors: Shinichi Ishikura, Kyoto; Kazunori Kanda, Yao; Katsuaki Kida, Osaka; Ryuzo Mizuguchi, Yahata, all of Japan

[73] Assignee: Nippon Paint Co., Ltd., Osaka, Japan

[21] Appl. No.: 460,877

[22] Filed: Jan. 25, 1983

[30] Foreign Application Priority Data

Jan. 27, 1982 [JP] Japan .................................. 57-13052

[51] Int. Cl.³ ........................ C08L 75/06; C08L 61/28
[52] U.S. Cl. .................................... 525/123; 524/512; 524/513; 524/517; 524/522; 525/125; 525/162; 525/166
[58] Field of Search .................. 525/123, 125, 162; 524/512, 513, 517, 522

[56] References Cited

U.S. PATENT DOCUMENTS

| | | | |
|---|---|---|---|
| 4,116,912 | 9/1978 | Mizuguchi et al. | 524/816 |
| 4,180,489 | 12/1979 | Andrew | 428/402 |
| 4,309,327 | 1/1982 | Ishikura et al. | 524/814 |
| 4,336,177 | 6/1982 | Backhouse et al. | 525/902 |

*Primary Examiner*—Theodore E. Pertilla
*Attorney, Agent, or Firm*—Wenderoth, Lind & Ponack

[57] ABSTRACT

A high solid coating composition comprising
(A) a film-forming polymer having functional group(s) capable of reacting with the crosslinking agent (D) hereinafter referred to,
(B) a volatile organic liquid diluent in which the polymer (A) is carried,
(C) polymer microparticles having an average diameter of from 0.02 to 40 microns, which are insoluble in the combination of the film-forming polymer (A) and the diluent (B) and are maintained in a stabilized state of dispersion therein, and
(D) a crosslinking agent dissolved in the diluent (B), which is characterized by the fact that the microparticles (C) are composed of crosslinked copolymer obtained by copolymerizing at least one of the polymerizable amino acid compounds of the formula:

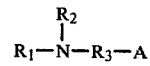

with other polymerizable α,β-ethylenically unsaturated monomers, at least part of which is crosslinking monomer.

1 Claim, No Drawings 4,468,493

HIGH SOLID COATING COMPOSITION CONTAINING NOVEL MICROPARTICLES OF CROSSLINKED COPOLYMER CONTAINING AMPHOIONIC GROUPS

FIELD OF INVENTION

The present invention relates to a high solid coating composition having contained therein novel polymeric microparticles, which is particularly useful as a decorative coating for automobile bodies and other articles.

BACKGROUND OF INVENTION

Recently, a high solid coating composition comprising crosslinked polymeric microparticles dispersed in a conventional coating composition containing film-forming resinous vehicle, has been watched with keen interest in various coating areas, and especially in an automobile industry, because of its eminent workability and the capability of the resultant coating to exhibit excellent film performance. These particles are composed of a polymer crosslinked to the extent that it is insoluble in an organic solvent in which the particels are dispersed, finely pulverized to micron size, and stably dispersed in the coating composition. Dispersions of said microparticles in a solvent or a carrying vehicle are sometimes referred to, for convenience, as "microgels".

In preparing such microgels, various methods have been proposed. One of the methods proposed comprises the combination of steps of preparing fine particles of polymer by an emulsion polymerization technique for ethylenically unsaturated monomer and other crosslinkable, polymerizable monomer in an aqueous medium, and separating thus formed microgel particles from the reaction system by solvent replacement, azeotropic distillation, centrifugal separation, filtering, drying and other means. Another one is the so-called NAD (non-aqueous dispersion) method comprising reacting monomer having an ethylenical unsaturation and other copolymerizable crosslinking monomer in a non-aqueous organic solvent which may dissolve monomers but not the formed polymer, and separating thus formed polymer fine particles therefrom.

For industrial purposes, much preference is given to the former because the formation of fine particles and the removal of reaction heat can be easily accomplished. However, in that method, one extra step is always required to remove water from the formed emulsion. Furthermore, since a comparatively low molecular weight compound, mainly an anionic or cationic surfactant, is customarily used as an emulsifier for assisting effective dispersion of monomers in an aqueous medium and this is always carried, by adhesion, onto the surfaces of polymer particles, the same is, when coated, necessarily contained in the coating, exerting harmful effects on the film performance as to water resistance and the like. In addition, in the emulsion polymerization step, an aqueous medium is used, whereas in the formulation of a coating composition, (a) volatile organic solvent (s) such as aromatic hydrocarbons, is(are) customarily used. Since it is quite difficult to cause the emulsifier already used in the emulsion polymerization step assist dispersion of monomers in an aqueous medium, direct use of the microparticles in the subsequent formulation step i.e., to obtain a stable dispersion of microparticles in a different environment, e.g. of organic solvent, requires special means, i.e., to obtain a stable dispersion of said microparticles in the coating composition.

On the other hand, in the NAD method, use is made of a non-aqueous organic solvent which will scarcely dissolve the polymer in it. Therefore, the thus formed product may be directly added to the coating composition. Or even if the separation of microparticles is to be desired, it may be easily accomplished by mere adoption of simple filtering means. However, this NAD method possesses various problems inherent thereto and differing from those of the emulsion polymerization method. First of all, this method requires a particular type of dispersion stabilizing agent in the copolymerization of ethylenically unsaturated monomer and crosslinkable, copolymerizable monomer in a non-aqueous organic medium to obtain microgels. Usually, said stabilizing agent is a graft copolymer comprising a polymer backbone which is non-solvatable by the reaction medium composed of organic liquid, and a plurality of solvatable polymer chains pendant from the backbone. However, actual selection of said graft copolymer has to be made very carefully in due consideration of affinity for polymer particles as well as affinity for solvent, depending on the types of monomers and of non-aqueous organic solvent used. Furthermore, since a low polarity liquid solvent mainly composed of aliphatic hydrocarbons is used as an organic liquid in the preparation of microgels and a relatively high polar organic solvent in the formulation of coating composition, the dispersion stabilizing agent used in the microgel formation step is almost useless for the stabilization of microgels in the coating composition. As a solution to this problem, laid Open Japanese Patent Application Nos. 133234/78, 133235/78, 133236/78, and 150439/79 suggest that after formation of microgels, particular monomers capable of forming polymer having the same composition with that of film-forming polymer used in the coating composition are polymerized on the surfaces of said microgel particles, thereby effecting modification of polymer surfaces so as to accomodate themselves to the different circumstances. Thus, there are various problems in heretofore known methods for the preparation of microgels and high solid coating compositions using the same and no satisfactory solutions have been found yet.

Under the circumstances, it would be an immeasurable advancement of the technical level concerned if one could provide microgels containing no harmful component and capable of admixing with a coating composition without the necessity of adopting any special after treatment or using a particular type of stabilizing agent.

SUMMARY OF INVENTION

An object of the present invention is, therefore, to provide microparticles of polymer that are easily prepared without using any harmful emulsifier or stabilizing agent and are directly added to a coating composition as they are. Another object is to provide a high solid coating composition containing said microparticles of polymer in stabilized state of dispersion therein, which is excellent in workability and is particularly useful as a decorative coating for automobile bodies and other articles. The other objects of the invention will be apparent from the description of the specification and accompanying claims.

The invention, thus, provides a high solid coating composition comprising (A) a film-forming polymer having functional group capable of reacting with that of crosslinking agent (D) hereinafter referred to,
(B) a volatile organic liquid diluent in which the polymer (A) is carried,
(C) polymer microparticles having an average diameter of from 0.02 to 40 microns, which are insoluble in the combination of the film-forming polymer (A) and the diluent (B) and are maintained in a stabilized state of dispersion therein, and
(D) a crosslinking agent dissolved in the diluent (B), which is characterized by the fact that the microparticles are composed of polymer obtained by copolymerizing at least one of the polymerizable amino acid compounds of the formula:

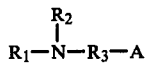

in which $R_1$ is a substituent having a polymerizable $\alpha,\beta$-ethylenic unsaturation, $R_2$ represents a member selected from hydrogen and optionally substituted $C_1 \sim C_{30}$ hydrocarbon residue, $R_3$ is a member selected from optionally substituted $C_1 \sim C_{12}$ hydrocarbon residue and A is $-COOH$ or $-SO_3H$,
with other polymerizable $\alpha,\beta$-ethylenically unsaturated monomers, at least part of which is crosslinking monomer.

DESCRIPTION OF SPECIFIC EMBODIMENTS

The film-forming polymer constituent (A) of the composition of this invention may be any of the polymers known to be useful in coating compositions, providing they have a functional group which is able to react with that of the crosslinking agent hereinafter referred to. Examples of such polymers are acrylic, alkyd and polyester resins bearing such functional groups as hydroxyl and carboxyl groups. Usually, they have an acid value of 0.5 to 60, hydroxyl number of 20 to 200 and number average molecular weight of 500 to 10,000.

To attain or promote hardening of said polymer (A), a crosslinking agent (D) is compounded together. This may be any of the known crosslinking agents customarily used in the related field, providing that they are soluble in an organic liquid diluent (B) and are capable of reacting with abovementioned functional group of the film-forming polymer constituent (A). Appropriate members are, for example, diisocyanates, diepoxides and aminoplast resins. Particularly preferable ones are melamine-formaldehyde condensation products, substantial portions of whose methylol groups are etherized with butanol or methanol.

The abovesaid film-forming polymer (A) is carried in a volatile organic liquid diluent (B) in the form of dispersion or solution, or may be partly in dispersion and partly in solution, though the crosslinking agent (D) is necessarily dissolved therein. Examples of such volatile organic liquid diluents are aromatic hydrocarbons as toluene, xylene and petroleum fractions of various boiling point ranges having a significant aromatic content, esters as butyl acetate, ethylene glycol diacetate and 2-ethoxyethyl acetate, ketones as acetone and methyl isobutyl ketone, and alcohols as butyl alcohol. Besides the abovementioned film-forming polymer constituent (A), crosslinking agent (D) and volatile organic liquid diluent (B), the coating composition of this invention, as the most characteristic feature thereof, contains novel polymer microparticles (C) hereinunder defined.

The polymer microparticles (C) present in the composition of the invention are composed of polymer obtained by copolymerizing at least one of the polymerizable amino acid compounds of the formula:

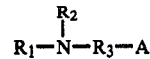

in which $R_1$ is a substituent having a polymerizable $\alpha,\beta$-ethylenic unsaturation bonding, $R_2$ represents a member selected from hydrogen and optionally substituted $C_1 \sim C_{30}$ hydrocarbon residue, $R_3$ represents a member selected from optionally substituted $C_1 \sim C_{12}$ hydrocarbon residue and A is $-COOH$ or $-SO_3H$, with other polymerizable $\alpha,\beta$-ethylenically unsaturated monomers, at least part of which is crosslinking monomer.

They are insoluble in the combination of the film-forming polymer (A) and the diluent (B) because of the characteristic of crosslinking and are maintained in a stabilized state of dispersion in the coating composition because of the presence of amphoionic radicals in that copolymer. They should preferably have an average diameter of from 0.02 to 40 microns.

Thus, in the present microparticle polymer, the presence of crosslinking is essential, for which is selected as a part of polymerizable ethylenically unsaturated monomers, a crosslinking monomer. Employable members may be any of the known monomers of functionality greater than two. One of the preferable group members are the so-called polyfunctional monomers having two or more ethylenical unsaturations in molecule as polymerizable unsaturated monocarboxylic ester of polyhydric alcohol, polymerizable unsaturated alcoholic ester of polycarboxylic acid and aromatic compound substituted with more than 2 vinyl groups. Examples of such members are ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetra acrylate, pentaerythritol dimethacrylate, pentaerythritol trimetthacrylate, pentaerythritol tetramethacrylate, glycerol diacrylate, glycerol dimethacrylate, glycerol allyloxy dimethacrylate, 1,1,1-tris-hydroxymethylethane triacrylate, 1,1,1-tris-hydroxymethylethane dimethacrylate, 1,1,1-tris-hydroxymethylethane trimethacrylate, 1,1,1-tris-hydroxymethylpropane diacrylate, 1,1,1-tris-hydroxymethylpropane triacrylate, 1,1,1-tris-hydroxymethylpropane dimethacrylate, 1,1,1-tris-hydroxymethylpropane trimethacrylate, triallyl cyanurate, triallyl isocyanurate, triallyl trimellitate, diallyl terephthalate, diallyl phthalate and divinyl benzene. Crosslinking monomers may also be of the combination of two ethylenically unsaturated monomers each bearing a mutually reactive functional group as, for example, the combination of epoxy bearing ethylenically unsaturated monomer, such as glycidyl acrylate and glycidyl methacrylate, and carboxyl bearing ethylenically unsaturated monomer, such as acrylic acid, methacrylic acid and crotonic acid. Other examples of suitable combinations of mutually reactive functional groups are amine and carbonyl, epoxide and acid anhydride, amine and acid chloride, alkyleneimine and carbonyl, organoalkoxysilane and carbonyl, hydroxyl and isocyanate, and the like.

As other α,β-ethylenically unsaturated monomers, mention is made of the following:

(1) carboxyl bearing monomers as, for example, acrylic acid, methacrylic acid, crotonic acid, itaconic acid, maleic acid and fumaric acid,
(2) hydroxyl bearing monomers as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methally alcohol,
(3) nitrogen containing alkyl acrylates or methacrylates as, for example, dimethylamino ethyl acrylate, and dimethylaminoethyl methacrylate,
(4) polymerizable amides as, for example, acrylic amide and methacrylic amide,
(5) polymerizable nitriles as, for example, acrylonitrile and methacrylonitrile,
(6) alkyl acrylates or methacrrylates as, for example, methyl acrylate, methyl methacrylate, ethyl acrylate, n-butyl acrylate, n-butyl methacrylate, and 2-ethylhexyl acrylate,
(7) polymerizable aromatic compounds as, for example, styrene, α-methyl styrene, vinyl toluene and t-butyl styrene,
(8) α-olefins as, for example, ethylene and propylene,
(9) vinyl compounds as, for example, vinyl acetate and vinyl propionate,
(10) diene compounds as, for example, butadiene and isoprene, and the like.

These monomers are used either singularly or in combination of more than two. The abovementioned α,β-ethylenically unsaturated monomers and crosslinking monomers are reacted in an aqueous or organic liquid medium in a conventional way. However, in the present invention, as the third and most important copolymerization component, a polymerizable amino acid compound of the formula:

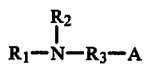

in which $R_1$ is a substituent containing a polymerizable ethylenic unsaturation bonding, $R_2$ represents hydrogen or optionally substituted $C_1 \sim C_{30}$ hydrocarbon residue, $R_3$ is a member selected from optionally substituted $C_1 \sim C_{12}$ hydrocarbon residue and A is —COOH or —SO$_3$H, is selectively used. By the adoption of this particular copolymerization monomer, the characteristic ampho ionic function is included in the molecule of the present microparticle polymer. These polymerizable amino acid compounds may be advantageously prepared by the reaction between an oxirane compound and an amino acid compound having a primary or secondary amino group or the reaction between benzylhalide compound and amino sulfon compound having primary or secondary amino group, as stated in Japanese patent application No. 24461/81, filed on Feb. 20, 1981 by Nippon Paint Co., Ltd (now laid open as Kokai No. 139111/82).

Examples of $R_1$ are the groups represented by the formulas:

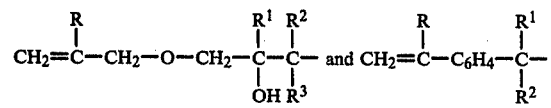

wherein R, $R^1$, $R^2$ and $R^3$ each represents hydrogen or an alkyl group, examples of $R_2$ are hydrogen and $C_1 \sim C_{20}$ alkyl optionally including in the carbon chain a group of —SO—, —COO— or —O—, and examples of $R_3$ are $C_1 \sim C_{12}$ alkylene and phenylene, optionally substituted with $C_1 \sim C_4$ alkyl group. More specifically, the following are named as examples of said polymerizable amino acid compound.

N-(2-hydroxy-3-allyloxypropyl) taurine
2-{N-(2-hydroxy-3-allyloxypropyl)} aminopropane sulfonic acid-(1)
1-{N-(2-hydroxy-3-allyloxypropyl)} aminopropane sulfonic acid-(2)
3-{N-(2-hydroxy-3-allyloxypropyl)} aminobutane sulfonic acid-(2)
2-{(2-hydroxy-3-allyloxypropyl)} aminobutane sulfonic acid-(1)
1-{N-(2-hydroxy-3-allyloxypropyl)} amino-2-methylpropane sulfonic acid (2)
3-{N-(2-hydroxy-3-allyloxypropyl)} aminopentane sulfonic acid-(2)
4-{N-(2-hydroxy-3-allyloxypropyl)} amino-2-methylpentane sulfonic acid-(3)
3-{N-(2-hydroxy-3-allyloxypropyl)} aminopropane sulfonic acid-(1)
4-{N-(2-hydroxy-3-allyloxypropyl)} aminobutane sulfonic acid-(2)
4-{N-(2-hydroxy-3-allyloxypropyl)} aminobutane sulfonic acid-(1)
5-{N-(2hydroxy-3-allyloxypropyl)} aminopentane sulfonic acid-(1)
10-{N-(2-hydroxy-3-allyloxypropyl)} aminodecane sulfonic acid-(1)
N-methyl-N-(2-hydroxy-3-allyloxypropyl) taurine
N-ethyl-N-(2-hydroxy-3-allyloxypropyl) taurine
N-propyl-N-(2-hydroxy-3-allyloxypropyl) taurine
N-butyl-N-(2-hydroxy-3-allyloxypropyl) taurine
N-heptyl-N-(2-hydroxy-3-allyloxypropyl) taurine
N-dodecyl-N-(2-hydroxy-3-allyloxypropyl) taurine
N-heptadecyl-N-(2-hydroxy-3-allyloxypropyl) taurine
N-(2-octadecyl sulfinylethyl)-N-(2-hydroxy-3-allyloxypropyl) taurine
N-(2-stearoyloxyethyl)-N-(2-hydroxy-3-allyloxypropyl) taurine
N-(2-hydroxy-3-methallyloxypropyl) taurine
N-(1-methyl-2-hydroxy-3-allyloxypropyl) taurine
N-(2-hydroxy-3-allyloxypropyl) glycine
N-(2-hydroxy-3-methallyloxypropyl) glycine
N-(2-hydroxy-3-methallyloxypropyl) sarcosine
N-(2-hydroxy-3-allyloxypropyl) alanine
N-(2-hydroxy-3-allyloxypropyl) β-alanine
N-methyl-N-(2-hydroxy-3-allyloxypropyl) β-alanine
N-ethyl-N-(2-hydroxy-3-allyloxypropyl) β-alanine
N-butyl-N-(2-hydroxy-3-allyloxypropyl) β-alanine
N-heptyl-N-(2-hydroxy-3-allyloxypropyl) β-alanine
N-dodecyl-N-(2-hydroxy-3-allyloxypropyl) β-alanine
N-heptadecyl-N-(2-hydroxy-3-allyloxypropyl) β-alanine
N-(1-methyl-2-hydroxy-3-allyloxypropyl) β-alanine N-(2-hydroxy-3-allyloxypropyl)-ε-aminocaproic acid
N-(2-hydroxy-3-allyloxypropyl)-threonine
N-(2-hydroxy-3-allyloxypropyl)-cystine
N-(2-hydroxy-3-allyloxypropyl)-methionine
N-(2-hydroxy-3-allyloxypropyl)-anthranilic acid
N-(2-hydroxy-3-allyloxypropyl)-m-aminobenzoic acid
N-(2-hydroxy-3-allyloxypropyl)-p-aminobenzoic acid
N-(2-hydroxy-3-allyloxypropyl) orthanilic acid
N-(2-hydroxy-3-allyloxypropyl) metanilic acid
N-(2-hydroxy-3-allyloxypropyl) sulfanilic acid
N-(vinylbenzyl) taurine
N-(isopropenylbenzyl) taurine
2-{N-(vinylbenzyl)} aminopropane sulfonic acid-(1)
2-{N-(isopropenylbenzyl)} aminopropane sulfonic acid-(1)
1-{N-(vinylbenzyl)} aminopropane sulfonic acid-(2)
1-{N-(isopropenylbenzyl)} aminopropane sulfonic acid-(2)
3-{N-(vinylbenzyl)} aminobutane sulfonic acid-(2)
3-{N-(isopropenylbenzyl)} aminobutane sulfonic acid-(2)
2-{N-(vinylbenzyl)} aminobutane sulfonic acid-(1)
2-{N-(isopropenylbenzyl)} aminobutane sulfonic acid-(1)
1-{N-(vinylbenzyl)} amino-2-methylpropane sulfonic acid-(2)
1-{N-(isopropenylbenzyl)} amino-2-methylpropane sulfonic acid-(2)
3-{N-(vinylbenzyl)} aminopentane sulfonic acid-(2)
3-{N-(isopropenylbenzyl)} aminopentane sulfonic acid-(2)
4-{N-(vinylbenzyl)} amino-2-methylpentane sulfonic acid-(3)
4-{N-(isopropenylbenzyl)} amino-2-methylpentane sulfonic acid-(3)
3-{N-(vinylbenzyl)} aminopropane sulfonic acid-(1)
3-{N-(isopropenylbenzyl)} aminopropane sulfonic acid-(1)
4-{N-(vinylbenzyl)} aminobutane sulfonic acid-(2)
4-{N-(isopropenylbenzyl)} aminobutane sulfonic acid-(2)
4-{N-(vinylbenzyl)} aminobutane sulfonic acid-(1)
4-{N-(isopropenylbenzyl)} aminobutane sulfonic acid-(1)
5-{N-(vinylbenzyl)} aminopentane sulfonic acid-(1)
5-{N-(isopropenylbenzyl)} aminopentane sulfonic acid-(1)
10-{N-(vinylbenzyl)} aminodecane sulfonic acid-(1)
10-{N-(isopropenylbenzyl)} aminodecane sulfonic acid-(1)
N-methyl-N-(vinylbenzyl) taurine
N-methyl-N-(isopropenylbenzyl) taurine
N-ethyl-N-(vinylbenzyl) taurine
N-ethyl-N-(isopropenylbenzyl) taurine
N-propyl-N-(vinylbenzyl) taurine
N-propyl-N-(isopropenylbenzyl) taurine
N-butyl-N-(vinylbenzyl) taurine
N-butyl-N-(isopropenylbenzyl) taurine
N-heptyl-N-(vinylbenzyl) taurine
N-heptyl-N-(isopropenylbenzyl) taurine
N-dodecyl-N-(vinylbenzyl) taurine
N-dodecyl-N-(isopropenylbenzyl) taurine
N-heptadecyl-N-(vinylbenzyl) taurine
N-heptadecyl-N-(isopropenylbenzyl) taurine
N-(2-octadecylsulfine ethyl)-N-(vinylbenzyl) taurine
N-(2-octadecylsulfine ethyl)-N-(isopropenylbenzyl) taurine
N-(2-stearoyloxyethyl)-N-(vinylbenzyl) taurine
N-(2-stearoyloxyethyl)-N-(isopropenylbenzyl) taurine
2-{-(vinylbenzyl)-N-methyl} aminopropane sulfonic acid-(1)
2-{N-(isopropenylbenzyl)-N-methyl} aminopropane sulfonic acid-(1)
2-{N-dodecyl-N-(vinylbenzyl)} aminopropane sulfonic acid-(1)
2-{N-dodecyl-N-(isopropenylbenzyl)} aminopropane sulfonic acid-(1)
2-{N-octadecyl-N-(vinylbenzyl)} aminopropane sulfonic acid-(2)
2-{N-(isopropenylbenzyl)-N-octadecyl} aminopropane sulfonic acid-(1)
1-{N-methyl-N-(vinylbenzyl)} amino-2-methylpropane sulfonic acid-(2)
1-{N-methyl-N-(isopropenylbenzyl)} amino-2-methylpropane sulfonic acid-(2)
3-{N-methyl-N-(vinylbenzyl)} aminopropane sulfonic acid-(1)
3-{N-methyl-N-(isopropenylbenzyl)} aminopropane sulfonic acid-(1)
N-(vinylbenzyl) octanilic acid
N-(isopropenylbenzyl) octanilic acid
N-(vinylbenzyl) metanilic acid
N-(isopropenylbenzyl) metanilic acid
N-(vinylbenzyl) sulfanilic acid, and
N-(isopropenylbenzyl) sulfanilic acid Since a polymerizable α,β-unsaturation bonding is included in said amino acid compound, it may participate directly in the copolymerization reaction. Furthermore, such compound can exhibit variegated surface activities and electrochemical characteristics depending on the surrounding atmosphere because of the amphoteric property thereof. This is especially true in an aqueous surrounding. Therefore, in the copolymerization of α,β-ethylenically unsaturated monomers and crosslinking monomers in an aqueous medium, said compound may discharge the duties of emulsifier or dispersing agent by itself, and there results, by an emulsion polymerization technique, a soapfree emulsion containing microparticles of crosslinked copolymer.

In carrying out the emulsion polymerization, the abovesaid amino acid compound may be present in the reaction system in an amount of 0.2~30% by weight, preferably 0.5~15% by weight, of the total monomers. This is because the desired dispersion stability can hardly be obtained in less than 0.2% by weight, and too large a quantity, though being not harmful to the reaction per se, is liable to cause some harmful effect on film performance after all.

As to the amount of croslinking monomer, it is in general determined in a range of from 0.01 to 20%, and preferably 0.1 to 10%, by weight of the total monomers used, and however, this is not critical in the present invention. What is essential is to present the monomer in the reaction system in an amount sufficient to make the microparticle polymer insoluble in the combination of film-forming polymer and organic liquid diluent. Usually, said insolubility of the microparticles may be checked by means of the following test. That is, the microparticles (1 part by weight) are shaken for 30 minutes with the organic liquid diluent (e.g. tetrahydrofuran) (100 parts by weight), the suspension is then centrifuged at 17,000 r.p.m. for 30 minutes. The supernatant liquid is decanted off and the residual polymer is dried and weighed. The weight of said polymer is compared with that of the microparticles originally taken. Where the result of this test indicates that the microparticles are acceptably insoluble in the diluent alone, it can be assumed that the particles will be at least equally insoluble in the combination of the film-forming polymer and the diluent.

The reaction medium, i.e. water, may be used in an amount so as to give a resinous emulsion of 2 to 65%, preferably 20 to 60%, non-volatile solid content. The aqueous medium may also contain a water miscible organic solvent, if required. As the polymerization initiator, any of the members known to be useful in the related technical field may satisfactorily be used including organic peroxides as benzoyl peroxide, t-butyl peroxide and cumene hyroperoxide, organic azo-compounds as azobis cyano valeric acid, azobisisobutyronitrile, azobis-(2,4-dimethyl)valero nitrile, and azobis-(2-amidinopropane)hydrochloride, inorganic water soluble radical initiators as potassium persulfate, ammonium persulfate, sodium persulfate and hydrogen peroxide, and redox type initiators comprising the combination of said inorganic water soluble radical initiator and sodium pyrosulfite, sodium hydrogen sulfite or bivalent Fe ion. They may be used each singularly or in the combination of more than 2. Such initiator may be previously contained in the reaction medium or may be added to the reaction system simultaneously with the addition of constituting monomers. The amount of initiator is usually in a range of from 0.05 to 5%, preferably 0.1 to 3%, by weight of the total monomers to be copolymerized. If desired, a normal chain transfer agent as lauryl mercaptan, hexyl mercaptan and the like may be present in an appropriate amount. It might be appreciated that thus formed microparticles are composed of crosslinked copolymer of $\alpha,\beta$-ethylenically unsaturated monomers having as pendants a number of amphoionic portions of the formula:

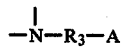

and hence, are insoluble in the combination of film-forming polymer (A) and the organic liquid diluent (B), irrespective of the fine particle size even in the order of 0.08 to 0.2$\mu$, and can be maintained in a stabilized state of dispersion in the coating composition.

Though the emulsion polymerization technique is particularly preferred, these microparticles may also be prepared by using a suspension or mass polymerization technique with an appropriate initiator and pulverizing thus obtained product by a mechanical crushing or grinding means, or by using the so-called NAD method hereinabove stated. In the present invention, thus obtained microparticles are added to the film-forming polymer (A)-organic liquid diluent (B)-crosslinking agent (D) system to give a high solid coating composition. The compounding ratio of these four components may be freely varied in comparatively wider ranges depending on the application and the desired effect, and however, in general, 50 to 99.5 parts by weight of the film-forming polymer (in terms of solid content) are compounded with 50 to 0.5 parts by weight of the microparticles. The amount of crosslinking agent is, in general, 5 to 100 parts by weight per 100 parts of the aggregated weight of the film-forming polymer and the microparticles (i.e. polymer components) and the amount of organic liquid diluent is about 10 to 2000 parts by weight per 100 parts of the aggregated weight of said polymeric components and the crosslinking agent (i.e. solid matters).

If desired, the coating composition of this invention may further contain other conventional additives as antioxidant, UV-absorber, surface modifier, viscosity modifier, pigment, metal flakes and the like. No specific techniques or apparatus are required for the preparation of the coating composition of this invention. The present coating compositions do possess an adequate fluidity for spray coating, and are able to make a thicker coating without the fear of sagging. The coatings are of highly gloss and excellent film-performance. Since the compositions contain neither low molecular emulsifying agent nor graft polymer dispersing agent usually found in the conventional compositions that may cause deterioration of film properties and the coatings are only of the resinous material integrally crosslinked and hardened, from the abovesaid microparticles, film-forming polymer and crosslinking agent, they are quite useful as decorative coatings for automobile bodies and the other articles. This is because of the characteristics of resulting films with excellent durability and good appearance. The present coating composition is further characterized by having an excellent low temperature curing property.

The invention shall now be more fully explained in the following Examples, which, however, should not be taken as being limitative in any sense. In these Examples, unless otherwise being stated, parts and % are by weight.

REFERENCE EXAMPLE 1

Preparation of microgel:

Into a reaction vessel equipped with stirrer and thermoregulator, were placed 216 parts of deionized water, and while maintaining the temperature at 80° C. and stirring, a mixture of 4.5 parts of azobiscyanovaleric acid, 4.28 parts of dimethylethanolamine and 45 parts of deionized water was added thereto. Next, at the same temperature, a first mixed solution of 6 parts of N-methyl-N-(vinylbenzyl) taurine, 2.1 parts of dimethylethanolamine, 6 parts of 2-hydroxyethyl acrylate and 90 parts of deionized water and a second mixed solution of 77.4 parts of methyl methacrylate, 103.2 parts of n-butyl acrylate, 77.4 parts of styrene, 24 parts of 2-hydroxyethyl acrylate and 6 parts of tetraethylene glycol dimethacrylate were simultaneously added in 60 minutes. After completion of said addition, to the mixture was added a mixture of 1.5 parts of azobiscyanovaleric acid, 1.42 parts of dimethylethanolamine and 1.5 parts of deionized water and it was stirred for additional 60 minutes to obtain an emulsion whose solid content was 45%, pH was 7.8, viscosity was 68 cps (25° C.) and an average particle size was 0.148$\mu$. This emulsion had no coagulates and was excellent in the mechanical stability thereof. The molecular weight of polymer constituting said emulsion was so high that it could not be dissolved in tetrahydrofuran and determination of molecular weight could not be carried out with a gel permeation chromatography.

This emulsion was then subjected to a spray drying to obtain polymer microparticles.

REFERNECE EXAMPLE 2

Preparation of microgel:

Repeating the procedures of Referemce Example 1 but substituting 3.7 parts of glycidyl methacrylate and 2.3 parts of methacrylic acid for tetraethyleneglycol dimethacrylate, an emulsion was obtained having a solid content 45%, pH 7.2 and a mean particle diameter 0.13μ. The tetrahydrofuran insoluble matter of the polymer constituting said emulsion was 78%. The emulsion was then subjected to a spray drying to obtain microparticles.

REFERENCE EXAMPLE 3

Preparation of acrylic resin varnish:

Into a vessel fitted with stirrer, thermoregulator and reflux condenser, were placed 710 parts of toluene and 200 parts of n-butanol. To this, 200 parts of the following mixture were added.

| | |
|---|---|
| methacrylic acid | 12 parts |
| styrene | 264 parts |
| methyl methacrylate | 264 parts |
| n-butyl acrylate | 360 parts |
| 2-hydroxyethyl acrylate | 100 parts |
| azobisisobutylonitrile | 10 parts | and the content was stirred and heated. While refluxing, the remaining 810 parts of the abovesaid mixture were added dropwise in 2 hours and then a solution of 3 parts of azobisisobutylonitrile in 100 parts of toluene was added in 30 minutes. Thereafter, the reaction mixture was further stirred and refluxed for 2 hours to complete the reaction, thereby obtaining an acrylic resin varnish having a solid content of 50%.

REFERENCE EXAMPLE 4

Preparation of alkyd resin varnish:

Into a reaction vessel fitted with stirrer, thermoregulator and decanter, were placed the following:

| | |
|---|---|
| dehydrated castor oil | 260 parts |
| coconut oil | 192 parts |
| trimethylol propane | 403 parts |
| diethyleneglycol | 65 parts |
| phthalic anhydride | 578 parts |
| xylene | 45 parts | and the mixture was stirred and heated, while removing the formed water azeotropically with xylene. At the time when the acid value and hydroxyl number reached between 10 and 100, the reaction was completed, and the product was diluted with xylene to obtain an alkyd resin varnish having a solid content 70% and Gardner viscosity Z.

REFERENCE EXAMPLE 5

Preparation of polyester resin varnish:

Into a reaction vessel fitted with stirrer, thermoregulator and decanter, were placed the following, which was stirred and heated.

| | |
|---|---|
| ethylene glycol | 39 parts |
| neopentyl glycol | 130 parts |
| azelaic acid | 236 parts |
| phthalic anhydride | 186 parts |
| xylene | 30 parts |

While removing the formed water azeotropically with xylene, the heating was continued until the acid value reached to 150. At this point, the mixture was allowed to cool to 140° C., added with 314 parts of Cardura E-10 (epoxy resin manufactured by Shell Chem. Co.) and stirred for 2 hours. Thus obtained resin had an acid value of 9, hydroxyl number of 90 and a number-average molecular weight of 1050. This was diluted with xylene to obtain a polyester resin varnish having a solid content 60% and Gardner viscosity Y.

EXAMPLE 1 AND COMPARATIVE EXAMPLE 1

Into a stainless steel vessel, the following were weighed and stirred well by means of laboratory mixer to obtain a coating composition.

| component | Example 1 | Comp. Exam. 1 |
|---|---|---|
| polymer microparticles of Ref. Exam. 1 | 25 parts | — |
| acrylic resin varnish of Ref. Exam. 3 | 500 parts | 500 parts |
| n-butanol modified melamine resin | 65 parts | 65 parts |

The respective composition was diluted with xylene/ethyleneglycol monobutyl ether=1/1 to adjust the viscosity to 25 seconds measured to Ford cup No. 4. The solid content of the present composition was 41.7%, whereas the solid content of the comparative composition was 37.6%. Also, the present composition was superior to the comparative one in respect of the sagging property in spray coating.

EXAMPLE 2 AND COMPARATIVE EXAMPLE 2

Using the same procedures as stated in Example 1, the following compositions were prepared.

| component | Example 2 | Comp. Exam. 2 |
|---|---|---|
| polymer microparticles of Ref. Exam. 2 | 5 parts | — |
| aluminum paste* | 13 parts | 13 parts |
| acrylic resin varnish of Ref. Exam. 3 | 200 parts | 200 parts |

*composition consisting of 64% aluminum flake, 15% stearic acid and 35% mineral spirit The respective composition was diluted with xylene/ethyleneglycol monobutyl ether=1/1 to adjust the viscosity to 20 seconds measured by Ford cup No. 4. When applied by means of conventional spray gun, it was found that the present composition was far superior to the comparative one in respect of pinhole and sagging properties and metal orientation.

EXAMPLE 3 AND COMPARATIVE EXAMPLE 3

100 parts of alkyd resin varnish obtained in Ref. Example 4 and 100 parts of Rutile type titanium dioxide were weighed in a dispersion vessel and stirred well by means of a paint conditioner to obtain a white colored paste. Using this paste, the following compositions were prepared.

| component | Example 3 | Comp. Example 3 |
|---|---|---|
| polymer microparticles of Ref. Exam. 1 | 30 parts | — |
| white colored paste | 200 parts | 200 parts |
| hexamethoxymethyl melamine | 35 parts | 35 parts |
| p-toluene sulfonic acid | 0.1 part | 0.1 part |

The respective composition was adjusted to the viscosity of 25 seconds measured by Ford cup No. 4, and applied by a conventional spray coating method and baked at 140° C. for 30 minutes. The film thickness of the coating of Example 3 was 45μ, whereas the thickness of the coating of Comparative Example 3 was 34μ.

EXAMPLE 4 AND COMPARATIVE EXAMPLE 4

100 parts of polyester resin of Reference Example 5 and 90 parts of Rutile type titanium dioxide were weighed in a dispersion vessel and stirred well by means of paint conditioner to obtain a white colored paste. Using this paste, the following coating compositions were prepared.

| component | Example 4 | Comp. Exam. 4 |
|---|---|---|
| polymer microparticles of Ref. Exam. 1 | 7 parts | — |
| white colored paste | 190 parts | 190 parts |
| trimer of hexamethylenediisocyanate (non-volatile content 60%) | 10 parts | 10 parts |

The respective composition was diluted with xylene/butylacetate=1/1 to adjust the viscosity to 25 seconds measured by Ford cup No. 4, applied by means of conventional spray coating and dried at 80° C. fop 30 minutes. The present composition was found to be far superior to the comparative one in respect of pinhole and sagging properties and film thickness obtained under the same coating conditions.

What is claimed is:

1. In a high solid coating composition comprising
(A) a film-forming polymer having functional group(s) capable of reacting with the crosslinking agent (D) hereinafter referred to,
(B) a volatile organic liquid diluent in which the polymer (A) is carried,
(C) polymer microparticles having an average diameter of from 0.02 to 40 microns, which are insoluble in the combination of the film-forming polymer (A) and the diluent (B) and are maintained in a stabilized state of dispersion therein, and
(D) a crosslinking agent dissolved in the diluent (B), the improvement wherein the microparticles (C) are composed of crosslinked copolymer obtained by copolymerizing at least one of the polymerizable amino acid compounds of the formula:

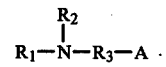

in which $R_1$ is a substituent having a polymerizable $\alpha,\beta$-ethylenic unsaturated bond, $R_2$ represents a member selected from the group consisting of hydrogen and substituted or unsubstituted $C_1 \sim C_{30}$ hydrogen residue, $R_3$ is a member selected from the group consisting of substituted or unsubstituted $C_1 \sim C_2$ hydrocarbon residue and A is —COOH or —$SO_3H$, with other polymerizable $\alpha,\beta$-ethylenically unsaturated monomers, at least part of which is crosslinking monomer.

* * * * *